US009764771B1

(12) United States Patent
Hiwatashi

(10) Patent No.: US 9,764,771 B1
(45) Date of Patent: Sep. 19, 2017

(54) COWL TOP GARNISH

(71) Applicant: MORIROKU TECHNOLOGY COMPANY, LTD., Tokyo (JP)

(72) Inventor: Tatsuya Hiwatashi, Tokyo (JP)

(73) Assignee: MORIROKU TECHNOLOGY COMPANY, LTD., Tokyo (JP)

( * ) Notice: Subject to any disclaimer, the term of this patent is extended or adjusted under 35 U.S.C. 154(b) by 0 days.

(21) Appl. No.: 15/458,425

(22) Filed: Mar. 14, 2017

(30) Foreign Application Priority Data

Mar. 31, 2016 (JP) .................................. 2016-070869

(51) Int. Cl.
*B62D 25/08* (2006.01)
*B60J 1/02* (2006.01)

(52) U.S. Cl.
CPC .............. *B62D 25/081* (2013.01); *B60J 1/02* (2013.01); *B60Y 2306/09* (2013.01)

(58) Field of Classification Search
CPC .................................. B60J 1/02; B62D 25/081
USPC .................................. 296/187.04, 192, 96.21
See application file for complete search history.

(56) References Cited

U.S. PATENT DOCUMENTS

| 6,565,148 | B1 * | 5/2003 | Teramoto | B62D 25/081 |
| | | | | 180/69.2 |
| 9,193,390 | B1 * | 11/2015 | Yoshida | B62D 25/081 |
| 9,415,744 | B1 * | 8/2016 | Stojkovic | B62D 21/152 |
| 2009/0085374 | A1 * | 4/2009 | Takei | B60R 21/34 |
| | | | | 296/187.09 |
| 2011/0049933 | A1 * | 3/2011 | Serizawa | B62D 25/081 |
| | | | | 296/192 |
| 2014/0265446 | A1 * | 9/2014 | Ellison | B62D 25/081 |
| | | | | 296/192 |
| 2014/0319878 | A1 * | 10/2014 | Sano | B62D 25/081 |
| | | | | 296/192 |
| 2015/0035318 | A1 * | 2/2015 | Serizawa | B62D 25/081 |
| | | | | 296/187.09 |
| 2015/0151791 | A1 * | 6/2015 | Sano | B62D 25/081 |
| | | | | 296/192 |
| 2015/0197285 | A1 * | 7/2015 | Hayakawa | B62D 25/081 |
| | | | | 296/192 |
| 2016/0023687 | A1 * | 1/2016 | Ichikawa | B62D 25/081 |
| | | | | 296/192 |

FOREIGN PATENT DOCUMENTS

JP          2014-43194         3/2014

* cited by examiner

*Primary Examiner* — Jason S Morrow
(74) *Attorney, Agent, or Firm* — Rankin, Hill & Clark LLP

(57) ABSTRACT

A cowl top garnish includes a protruding portion that protrudes upward, with its top being situated at an upper position when a vehicle body is viewed in a lateral cross-sectional view. The protruding portion has a front segment that is disposed in along the width of the vehicle and extends from the top in a lower forward direction, and a rear segment that extends from the top in a lower backward direction. The protruding portion is an element having flexibility that allows the front segment and the rear segment to spread when a load acts on the protruding portion from above the top. The front segment has a projecting portion that projects toward the rear segment. The rear segment has a load receiving portion onto which the projecting portion abuts to receive the load when the load acts on the front segment in the backward direction.

9 Claims, 9 Drawing Sheets

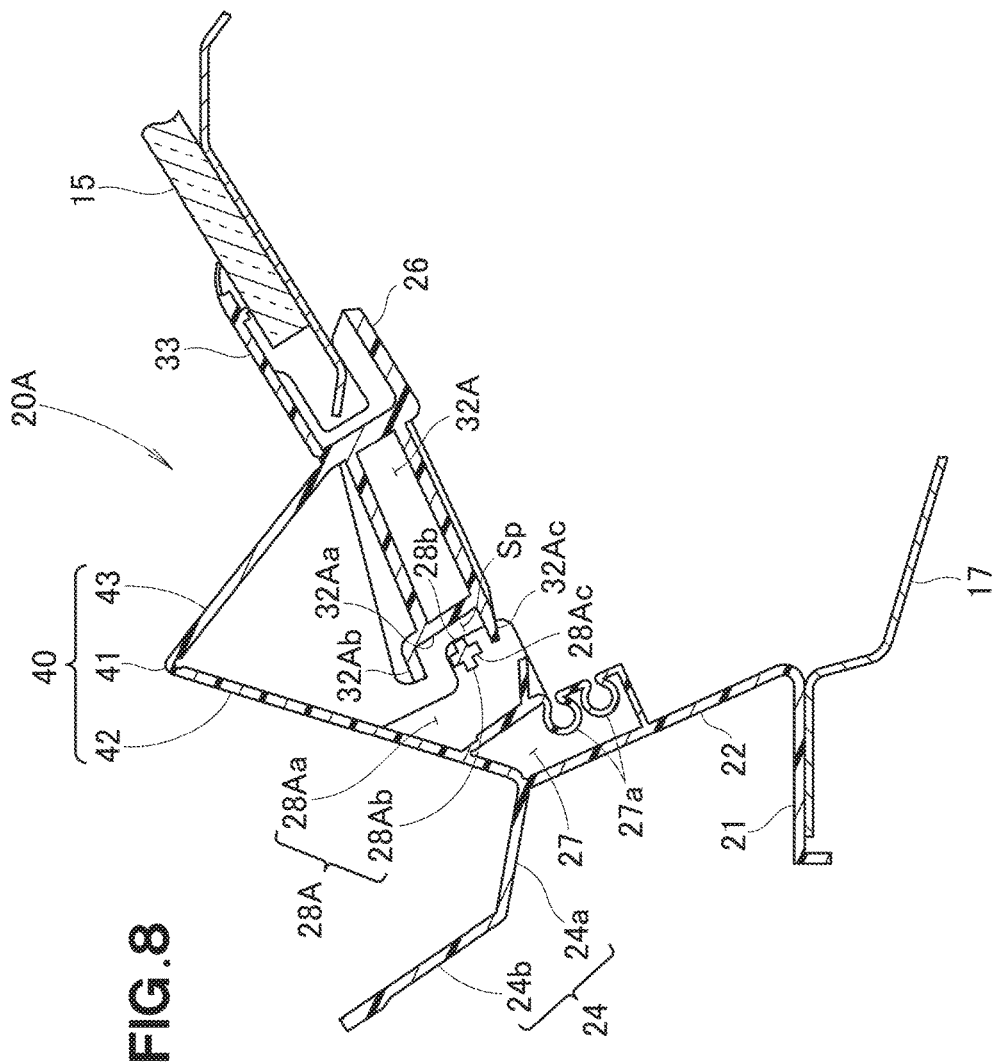

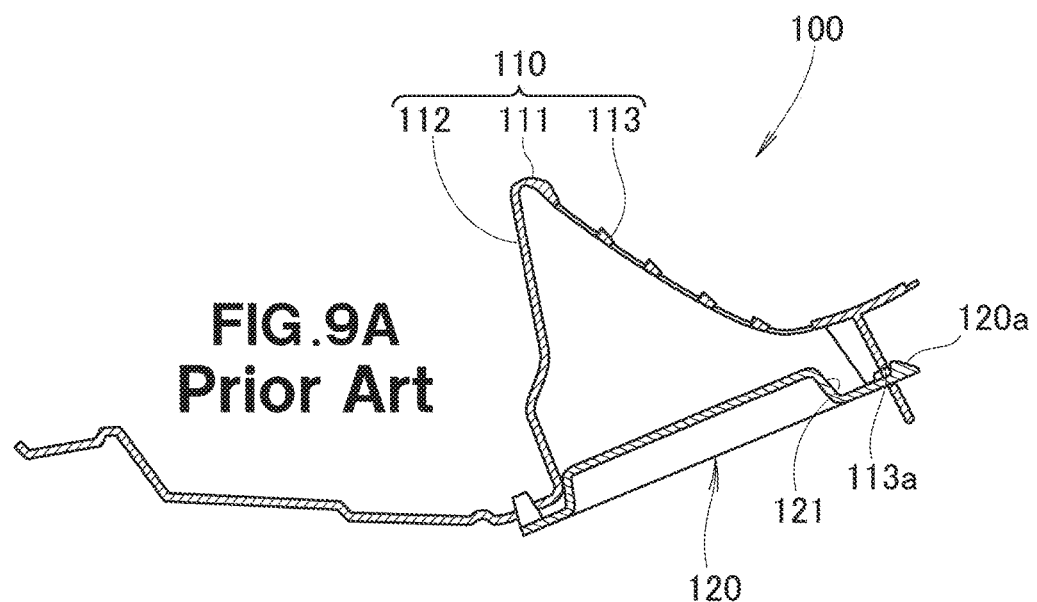
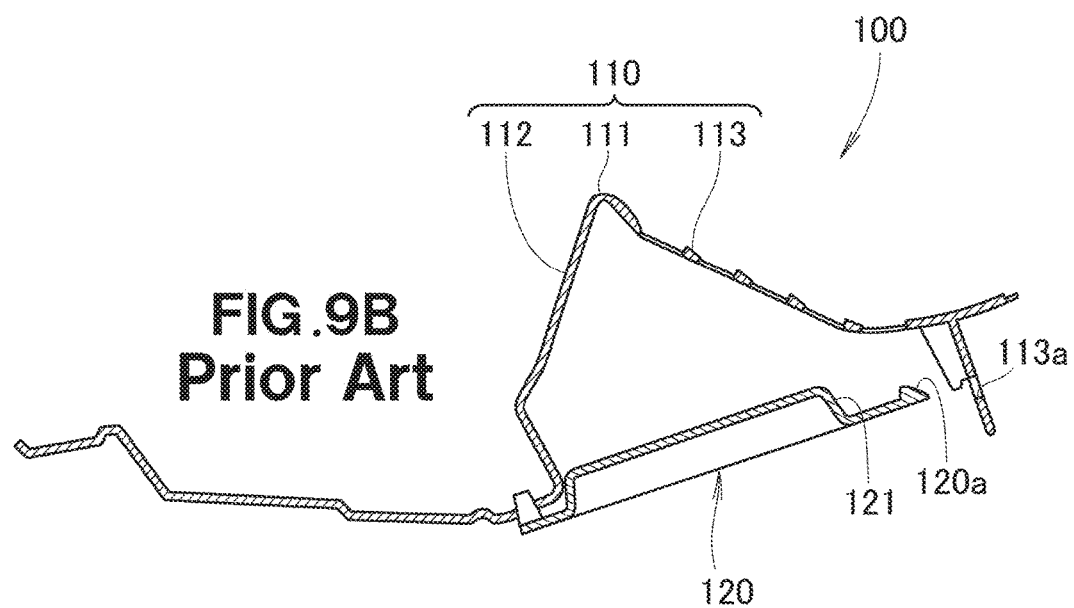

COWL TOP GARNISH

FIELD OF THE INVENTION

The present invention relates to a cowl top garnish that is located behind a hood disposed in a front part of a vehicle body, and extends in a width direction of a vehicle across an entire width of the vehicle to support a front lower end of a windbreak (windshield) panel.

BACKGROUND OF THE INVENTION

A front part of a vehicle body is covered with a hood that is swingably mounted on the vehicle body. A cowl top garnish is disposed behind the hood such that the cowl top garnish extends in a width direction of a vehicle across an entire width of the vehicle. The cowl top garnish is a member to support a front lower end of a windshield panel. A prior art that is relevant to the cowl top garnish is disclosed in, for example, Japanese Patent Application Laid-Open Publication No. 2014-43194.

FIG. 9A and FIG. 9B are referred to. FIG. 9A and FIG. 9B are reproductions of FIG. 9(B) and FIG. 9(C) of Japanese Patent Application Laid-Open Publication No. 2014-43194. Reference numerals have been renumbered for convenience of description.

The cowl top garnish 100 has a protruding portion 110, which has a generally inverted "V" shape, with its top 111 being at an upper location, when viewed in a cross-sectional view from a lateral direction of the vehicle body. The protruding portion 110 includes a front segment 112, which extends forward and downward from the top 111, and a rear segment 113, which extends rearward and downward from the top 111. The protruding portion 110 is a flexible portion that allows the front segment 112 and the rear segment 113 to expand or spread when a load acts on the protruding portion 110 from above the top 111.

A bridging member 120 extends from a lower end of the front segment 112 toward a lower end of the rear segment 113. A front end of the bridging member 120 is secured to the lower end of the front segment 112. A rear end of the bridging member 120 has a claw 120a, which is put into a hole 113a formed at the lower end of the rear segment 113. An upwardly standing wall 121 is formed in the vicinity of the rear end of the bridging member 120.

A load may act on the cowl top garnish 100 in a front-rear direction. If the load acts in the front-rear direction, the distance between the front segment 112 and the rear segment 113 decreases. In this situation, the standing wall 121 of the bridging member 120 contacts the lower end of the rear segment 113. This restricts the decreasing of the distance between the front segment 112 and the rear segment 113.

Also, an object may fall onto the protruding portion 110 from above the top 111. If the object falls over the protruding portion 111, the front segment 112 and the rear segment 113 spread, as specifically shown in FIG. 9B. As the front segment 112 and the rear segment 113 spread, the rear end of the bridging member 120 moves through the hole 113a, and the bridging member 120 disengages from the hole 113a. Upon the disengagement of the bridging member 120, the front segment 112 and the rear segment 113 further spread. This absorbs the shock exerted by the object.

When the bridging member 120 disengages from the rear segment 113 of the protruding portion 111, the claw 120a may contact the hole 113a formed at the lower end of the rear segment 113. If the claw 120a contacts the hole 113a, the disengagement is hindered to a certain extent, and therefore an impact is applied to the object. In other words, a load is applied to the object. Thus, there is room for improvement with regard to the shock absorbing capability.

SUMMARY OF THE INVENTION

An object of the present invention is to provide a cowl top garnish that can restrict the decreasing of the distance between the front segment and the rear segment, and also has an enhanced shock absorbing capability.

According to an embodiment of the present invention, there is provided a cowl top garnish disposed behind a hood provided at a front part of a vehicle body, the cowl top garnish extending in a width direction of a vehicle across an entire width of the vehicle, the cowl top garnish being configured to cover a front lower end of a windshield panel, the cowl top garnish including a protruding portion that protrudes upward, with its top being situated at an upper position when the vehicle body is viewed in a lateral cross-sectional view, the protruding portion having a front segment that is disposed along the width of the vehicle and extends from the top in a lower forward direction, and a rear segment that extends from the top in a lower backward direction, the protruding portion possessing flexibility such that the front segment and the rear segment spread when a load acts on the protruding portion from above the top, one of the front segment and the rear segment integrally having a projecting portion that projects toward the other of the front segment and the rear segment, and the other of the front segment and the rear segment integrally having a load receiving portion onto which the projecting portion abuts and receives a load acting in a substantially front-rear direction.

In this manner, the projecting portion of the present invention extends from one of the front segment and the rear segment toward the other of the front segment and the rear segment. The projecting portion abuts onto the load receiving portion at least when a load acts in the front-rear direction. Because the projecting portion abuts onto the load receiving portion, it is possible to restrict the decreasing of the distance between the front segment and the rear segment even when the load further acts in the front-rear direction. For example, when the cowl top garnish is assembled on the vehicle, it is possible to restrict the twisting and/or the bending of the cowl top garnish.

The front segment and the rear segment spread when a load acts on the protruding portion from above its top. The projecting portion is not coupled to the load receiving portion, in other words, the projecting portion is disconnected (independent) from the load receiving portion. When the front segment and the rear segment spread, the projecting portion and the load receiving portion do not hinder the spreading of the front segment and the rear segment. This can ensure an enhanced shock absorbing capability.

It is possible to provide a cowl top garnish that can restrict the decreasing of the distance between the front segment and the rear segment, and can have an enhanced shock absorbing capability.

Preferably, the load receiving portion inclines relative to the projecting portion such that the load receiving portion crosses the projecting portion when the vehicle body is viewed from the front.

This configuration allows the projecting portion to abut onto the load receiving portion in a more reliable manner. Thus, it is possible to transmit the load acting in the front-rear direction in a reliable manner.

Preferably, the projecting portion has a flat plate-like shape, and one of two flat surfaces of the flat plate-shape is directed upward.

In other words, the projecting portion is disposed along the horizontal plane. Thus, it is possible to efficiently form the projecting portion on the cowl top garnish and allow the cowl top garnish to deform even if the space for the cowl top garnish is limited in the height direction.

Preferably, the load receiving portion has a counter face portion that faces the free end of the projecting portion and is shaped like a plane.

The counter face portion, which faces the free end of the projecting portion, is configured to have a plane. Because the counter face portion has a plane such that the counter face portion has a large surface, it is possible to cause the projecting portion to contact the load receiving portion in a more reliable manner and transmit the load acting in the front-rear direction in a reliable manner.

Preferably, the counter face portion is thicker than the free end of the projecting portion in an up-down direction.

Because the counter face portion has a large surface, it is possible to cause the projecting portion to contact the load receiving portion in a more reliable manner and transmit the load acting in the front-rear direction in a reliable manner.

Preferably, the load receiving portion includes an upper extension that is situated overlappingly above the free end of the projecting portion and extends in the front-rear direction, and a lower extension that is situated overlappingly below the free end of the projecting portion and extends in the front-rear direction.

The free end of the projecting portion is located between the upper extension and the lower extension. With this configuration, the projecting portion can contact the load receiving portion in a reliable manner. It is possible to restrict the twisting and/or bending of the cowl top garnish in a more reliable manner when the cowl top garnish is mounted on the vehicle.

Preferably, the rear segment includes a windshield panel engaging portion, with which the windshield panel is engaged, the projecting portion is disposed on the front segment, and the load receiving portion is disposed on the windshield panel engaging portion.

With such configuration, it is possible to transmit the load, which acts in the front-rear direction, to the windshield panel engaging portion in a more reliable manner, and push the windshield panel engaging portion over the windshield panel.

Preferably, the projecting portion is spaced from the load receiving portion, and abuts onto the load receiving portion only when a load acts on the front segment in a backward direction or when a load acts on the rear segment in a forward direction.

Because the projecting portion is spaced from the load receiving portion, it is possible to more reliably prevent the projecting portion and the load receiving portion from hindering the spreading of the front segment and the rear segment when the front segment and the rear segment spread. This ensures a further enhanced shock absorbing capability.

Preferably, the free end of the projecting portion is covered with a cushioning material.

The projecting portion may contact the load receiving portion due to vibrations while the vehicle is traveling or in other occasions. As the cushioning material is disposed between the projecting portion and the load receiving portion, it is possible to restrict generation of noises while the vehicle is traveling.

BRIEF DESCRIPTION OF THE DRAWINGS

A plurality of preferred embodiments of the present invention will now be described in detail on the basis of the accompanying drawings, in which:

FIG. 8 is a cross-sectional view of the cowl top garnish shown in FIG. 7;

FIG. 9A is a cross-sectional view of the cowl top garnish according to the prior art; and FIG. 9B is a view useful to describe a reaction when a load acts on the cowl top garnish shown in FIG. 9A.

DETAILED DESCRIPTION OF THE PREFERRED EMBODIMENTS

Figure 1:
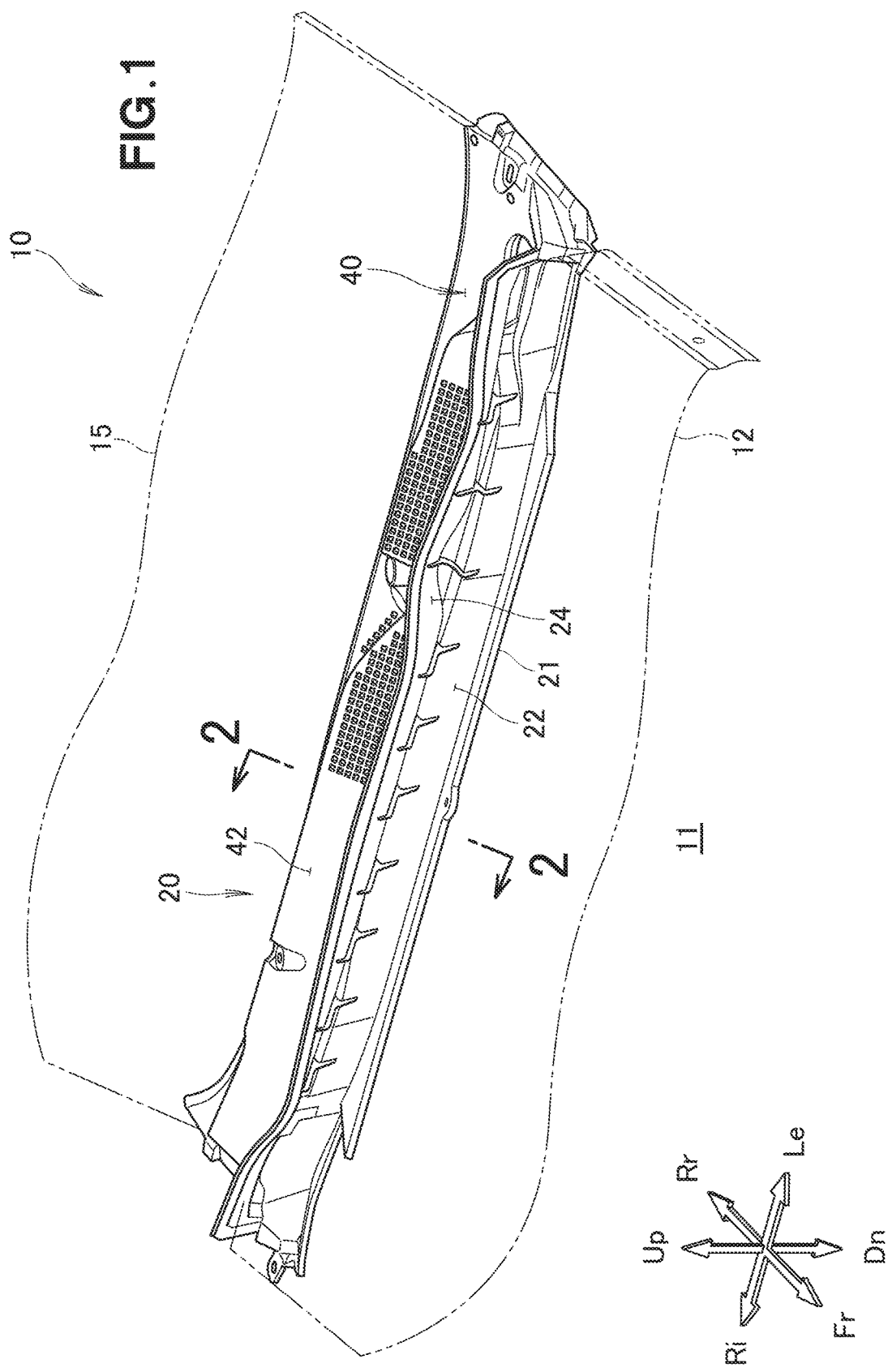
FIG. 1 is a perspective view of a cowl top garnish according to a first embodiment of the present invention.

Embodiments of the present invention will now be described below with reference to the accompanying drawings. In the following description, "right" and "left" are directions viewed from a passenger in a vehicle, and "front" and "rear" are normal moving directions of the vehicle. In the drawings, "Fr" indicates the front, "Rr" indicates the rear, "Le" indicates the left from the passenger, "Ri" indicates the right from the passenger, "Up" indicates the upward direction, and "Dn" indicates the downward direction.

First Embodiment

Referring to FIG. 1, a vehicle 10 has a hood 12 that is swingably disposed at a front part of a vehicle body to cover an engine room 11, a cowl top garnish 20 that is disposed behind the hood 12 and extends in a width direction of the vehicle across the entire width of the vehicle, and a windshield panel 15 that has a front lower end covered with the cowl top garnish 20.

The cowl top garnish 20 is an integrally molded resin product.

Figure 2:
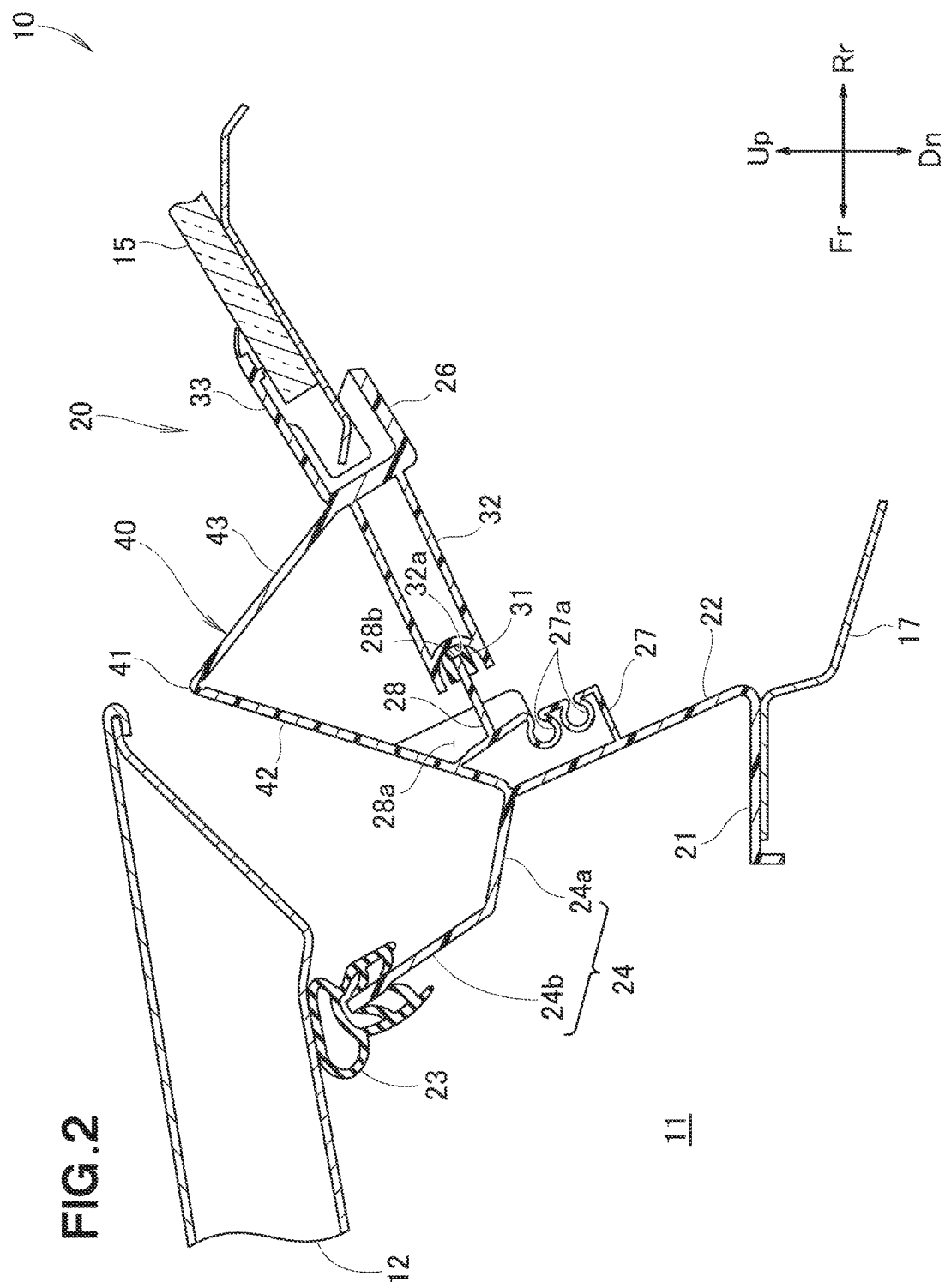
FIG. 2 is a cross-sectional view taken along the line 2-2 in FIG. 1.
Figure 3:
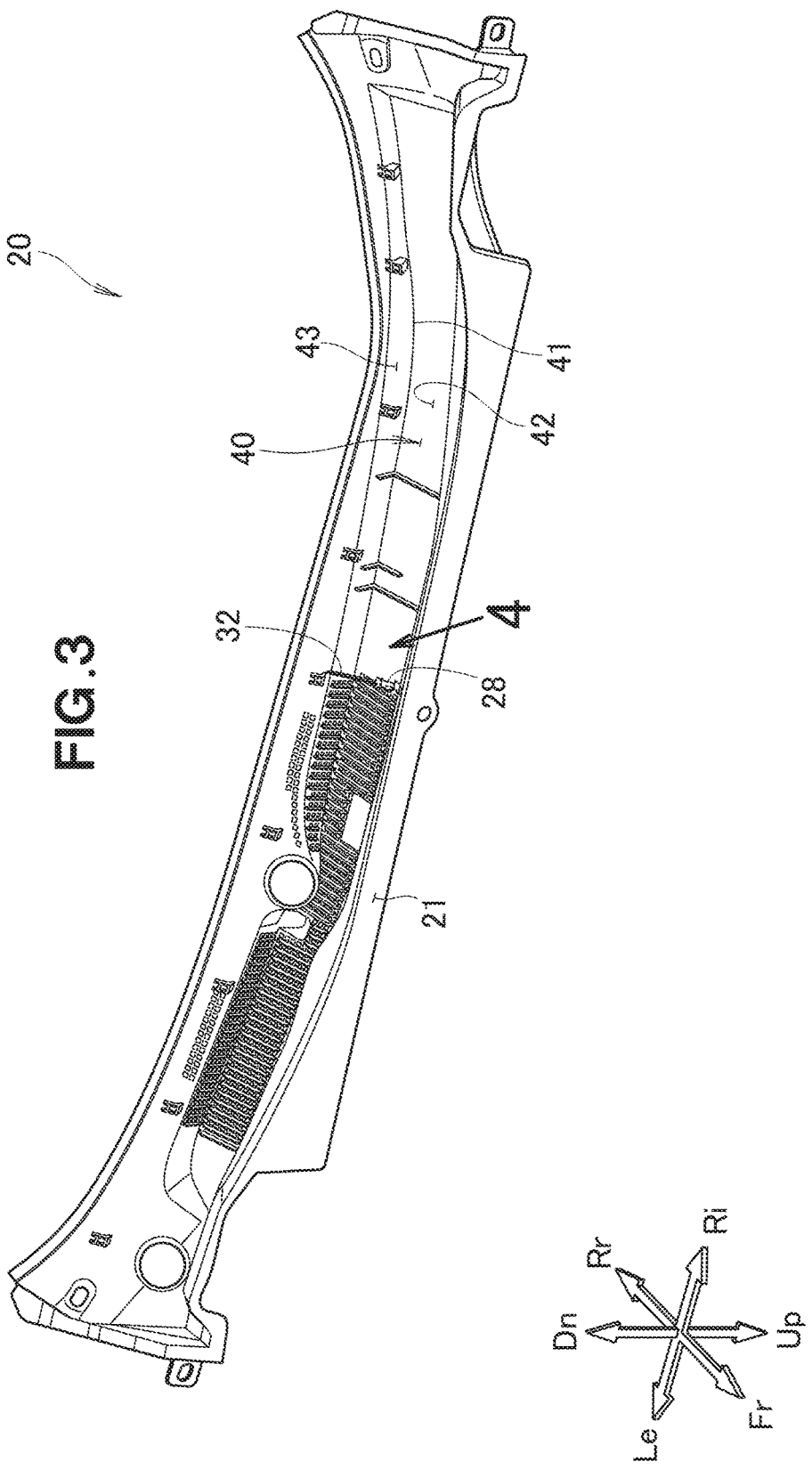
FIG. 3 is a perspective view of the cowl top garnish shown in FIG. 1 when viewed from the bottom thereof.

FIG. 2 and FIG. 3 are referred to. The cowl top garnish 20 is shown in the cross-sectional view in FIG. 2 when viewed from the side of the vehicle body. The cowl top garnish 20 shown in FIG. 3 is the cowl top garnish 20 viewed from the bottom. Thus, the right and left directions and the upward and downward directions of the cowl top garnish 20 illustrated in FIG. 3 are opposite the right and left directions and the upward and downward directions of the cowl top garnish 20 illustrated in FIG. 1. The cowl top garnish 20 is arranged on a dashboard upper 17 that constitutes part of the vehicle body.

The cowl top garnish 20 includes a garnish base portion 21 disposed along an upper face of the dashboard upper 17, a garnish wall portion 22 standing upward and forward from the garnish base portion 21, a garnish front extension 24 extending upward and forward from the garnish wall portion 22, with a seal 23 being attached at a free end thereof, a protruding portion 40 extending backward from an upper end of the garnish wall portion 22 and protruding upward in the form of a generally inverted "V" shape, a protruding portion support 27 extending from the garnish wall portion 22 to the protruding portion 40, a projecting portion 28 supported by the protruding portion support 27 and projecting backward, a cushioning material 31 disposed at a free end of the projecting portion 28, and a load receiving portion 32 extending from the rear end of the protruding portion 40 toward the cushioning material 31 and contacting the cushioning material 31. The projecting portion 28 and the load receiving portion 32 are provided at one location in the middle of the protruding portion 40 in the width direction of the vehicle.

The garnish front extension 24 and the front part of the protruding portion 40 form, in combination, a gutter. The garnish front extension 24 has a generally "V" shape with an obtuse angle when viewed in a cross-sectional view from the side of the vehicle body. The garnish front extension 24 has a first segment 24a, which forms a bottom of the gutter, and a second segment 24b, which extends upwards from a front end of the first segment 24a and defines a front wall of the gutter. The seal 23, which is disposed at the upper end of the second segment 24b, contacts the hood 12 and restricts water from entering the engine room 11.

The first segment 24a inclines backward and downward. This allows the lowest point of the gutter to become the boundary between the garnish front extension 24 and the protruding portion 40 and to become the upper end of the garnish wall portion 22.

The protruding portion 40 has a generally inverted "V" shape, with an acute angle and its top 41 being located at an upper position, when the vehicle body is viewed in the cross-sectional view from the side thereof. The protruding portion 40 extends in the width direction of the vehicle. The protruding portion 40 has a front segment 42, which extends forward and downward from the top 41, and a rear segment 43, which extends backward and downward from the top 41. The protruding portion 40 is a flexible portion that is configured to allow the front segment 42 and the rear segment 43 to spread when a load acts on the protruding portion 40 from above the top 41.

The rear segment 43 includes a panel covering portion 33, which extends backward and covers an upper face of a lower end of the windshield panel 15, and windshield panel engaging portions 26, which are formed below the panel covering portion 33 and engage with the lower end of the windshield panel 15. It can be said that the windshield panel engaging portions 26 constitute a lower part of the rear segment 43. The panel covering portion 33 and the windshield panel engaging portions 26 are portions that are continuously formed from the rear segment 43 and are able to bend together with the rear segment 43.

It should be noted that the shape of the protruding portion 40 may have an angle shape with a flat top 41 as long as the overall shape of the protruding portion 40 protrudes upward.

The top 41 has a reduced thickness, the connection between the front segment 42 and the garnish wall portion 22 has a reduced thickness, and the connection between the rear segment 43 and each of the windshield panel engaging portions 26 has a reduced thickness, as compared to other parts of the cowl top garnish. This configuration allows the protruding portion 40 to bend and spread easily.

The windshield panel engaging portions 26 are intermittently formed at a plurality of locations in the width direction of the vehicle, and continuously extend backward from the rear segment 43. The windshield panel engaging portions 26 may directly receive the front lower end of the windshield panel 15, or may indirectly receive the front lower end of the windshield panel 15 with the vehicle body being interposed therebetween.

Figure 4:
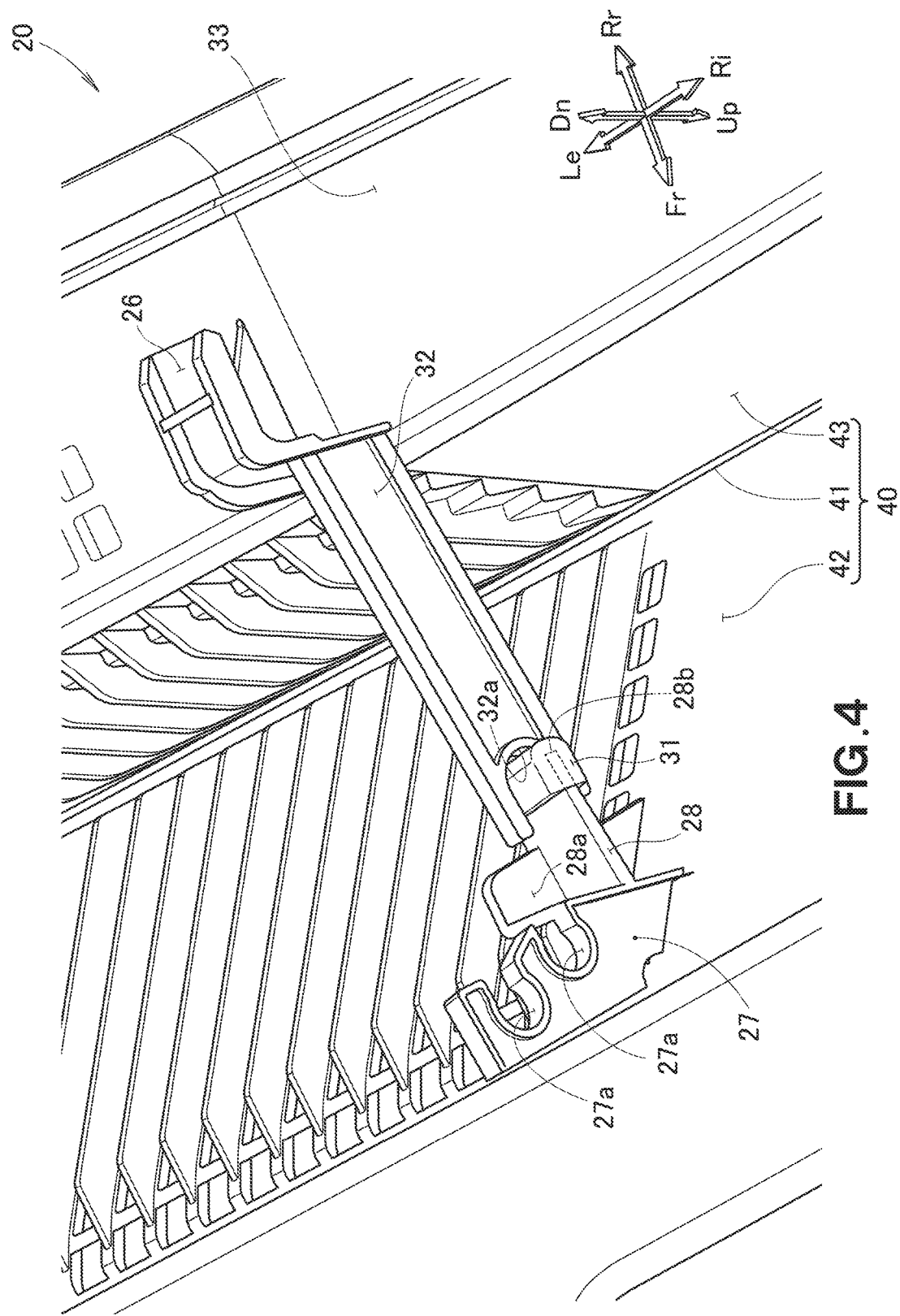
FIG. 4 is a drawing when viewed from the direction of the arrow 4 in FIG. 3.

FIG. 2 and FIG. 4 are now referred to. FIG. 4 is a drawing when the protruding portion 40, the projecting portion support 27, the projecting portion 28, the cushioning material 31 and the load receiving portion 32 are looked at from the bottom. Thus, the right direction, the left direction, the upward direction and the downward direction of the cowl top garnish 20 shown in FIG. 4 are opposite those of the cowl top garnish 20 shown in FIG. 1.

The projecting portion support 27 continuously extends to the front segment 42 from the garnish wall portion 22. The projecting portion support 27 has two tube clamps 27a. Each of the two tube clamps 27a has a generally "C" shape, which is open to the rear, when viewed from the side of the vehicle. The two tube clamps 27a are aligned in a generally up-down direction.

The projecting portion 28 is provided on the front segment 42 and extends rearward. The projecting portion 28 has a flat plate shape, and one of two flat surfaces of the flat plate shape is directed upward. In other words, the projecting portion 28 disposes substantially horizontal plane and extends in the front-rear direction. The projecting portion 28 is reinforced by a rib 28a that extends in the up-down direction. This restricts the projecting portion 28 from bending.

It should be noted that the projecting portion 28 may be formed on the rear segment 43 and project toward the front segment 42. In such configuration, the load receiving portion 32 is provided at the front segment 42. Therefore, one of the front segment 42 and the rear segment 43 integrally has the projecting portion 28 that projects toward the other of the front segment 42 and the rear segment 43, and the other of the front segment 42 and the rear segment 43 integrally has the load receiving portion 32.

The free end (rear end) 28b of the projecting portion 28 is covered with (enclosed by) the cushioning material 31.

The cushioning material 31 may be made from rubber or soft resin. The free end of the cushioning material 31 abuts onto the load receiving portion 32.

It should be noted that the cushioning material 31 (including the projecting portion 28) may be disposed such that a gap is left between the load receiving portion 32 and the cushioning material 31. It is important in the present invention that the projecting portion 28 is not coupled to the load receiving portion 32, but the projecting portion 28 abuts onto the load receiving portion 32 when a load acts in the front-rear direction. The details of this configuration will be described later.

The load receiving portion 32 is disposed on the rear segment 43. The load receiving portion 32 is a plate-like member that stands in the up-down direction. The load receiving portion 32 extends toward the projecting portion 28 from the rear segment 43. The load receiving portion 32 extends toward the projecting portion 28 from the lower end of the rear segment 43, and the opposite plate faces of the load receiving portion 32 face in the right direction and the left direction.

The load receiving portion 32 extends in the front-rear direction along the vertical plane, with its standing posture being maintained. On the other hand, the projecting portion 28 extends in the front-rear direction, with its laid-down posture being maintained. Therefore, the load receiving portion 32 inclines relative to the projecting portion 28, when viewed from the front of the vehicle body, such that the load receiving portion 32 crosses the projecting portion 28.

The free end of the load receiving portion 32 defines a counter face portion 32a that faces the free end 28b of the projecting portion and has a planar surface. The counter face portion 32a has a generally turned "U" shape that opens in the front direction.

The counter face portion 32a has a larger dimension (thicker) than the free end 28b of the projecting portion 28 in the up-down direction. The tip and the upper and lower faces of the free end 28b of the projecting portion 28 are covered with the counter face portion 32a.

Figure 5:
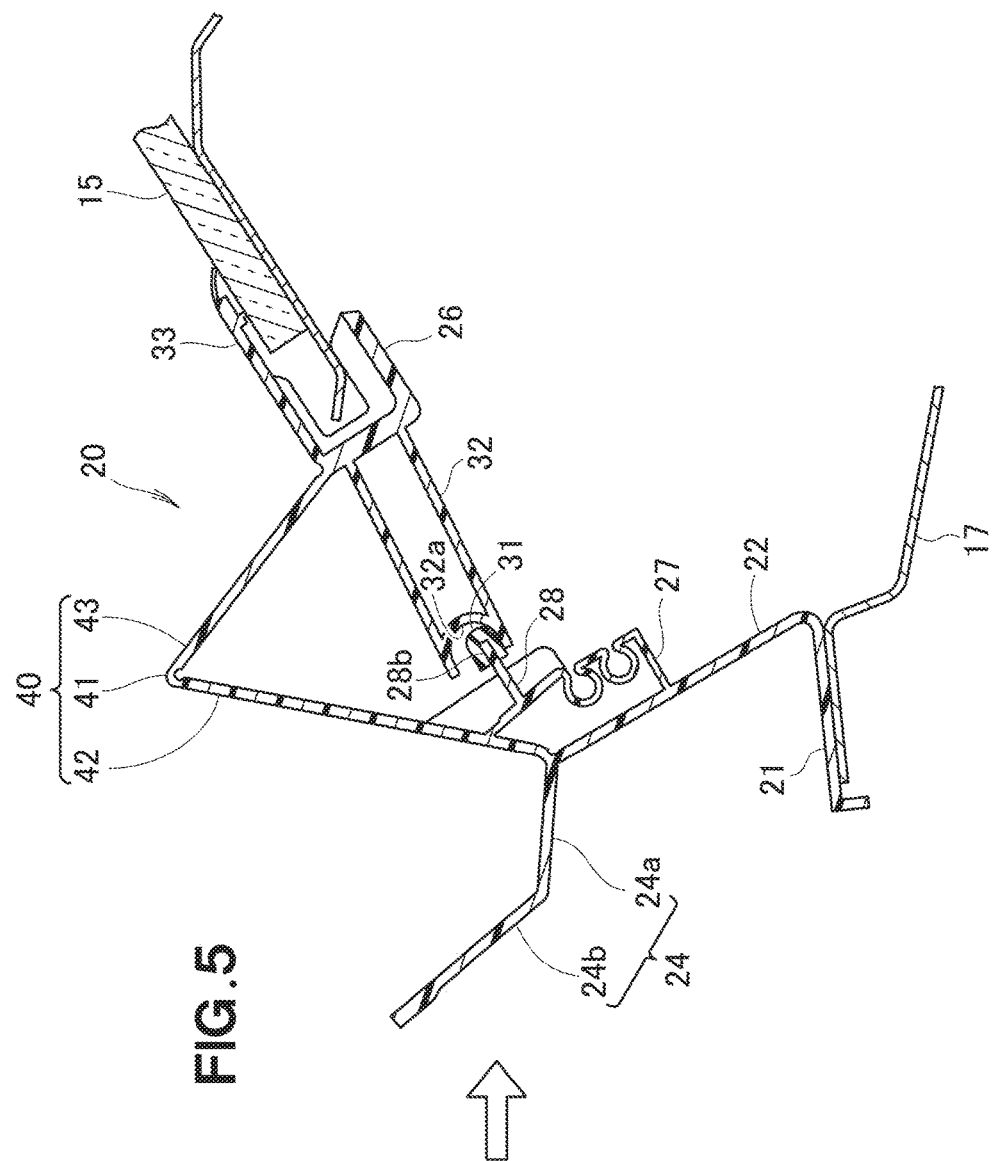
FIG. 5 is a view useful to describe the mounting of the cowl top garnish shown in FIG. 2.

Referring to FIG. 5, the functions of the cowl top garnish 20 having the above-described configuration will be described.

For example, the cowl top garnish 20 is mounted on the vehicle body by sliding the cowl top garnish 20 relative to the vehicle body from the front toward the rear of the vehicle body. In this situation, a load acts on the cowl top garnish 20 in the front-rear direction, as indicated by the white arrow. The projecting portion 28 contacts the load receiving portion 32 while the load is acting on the cowl top garnish in the front-rear direction.

The projecting portion 28 abuts onto the load receiving portion 32 and the load acts on the load receiving portion 32 when the load acts on the front segment 42 in the rear direction or when the load acts on the rear segment 43 in the front direction.

Figure 6:
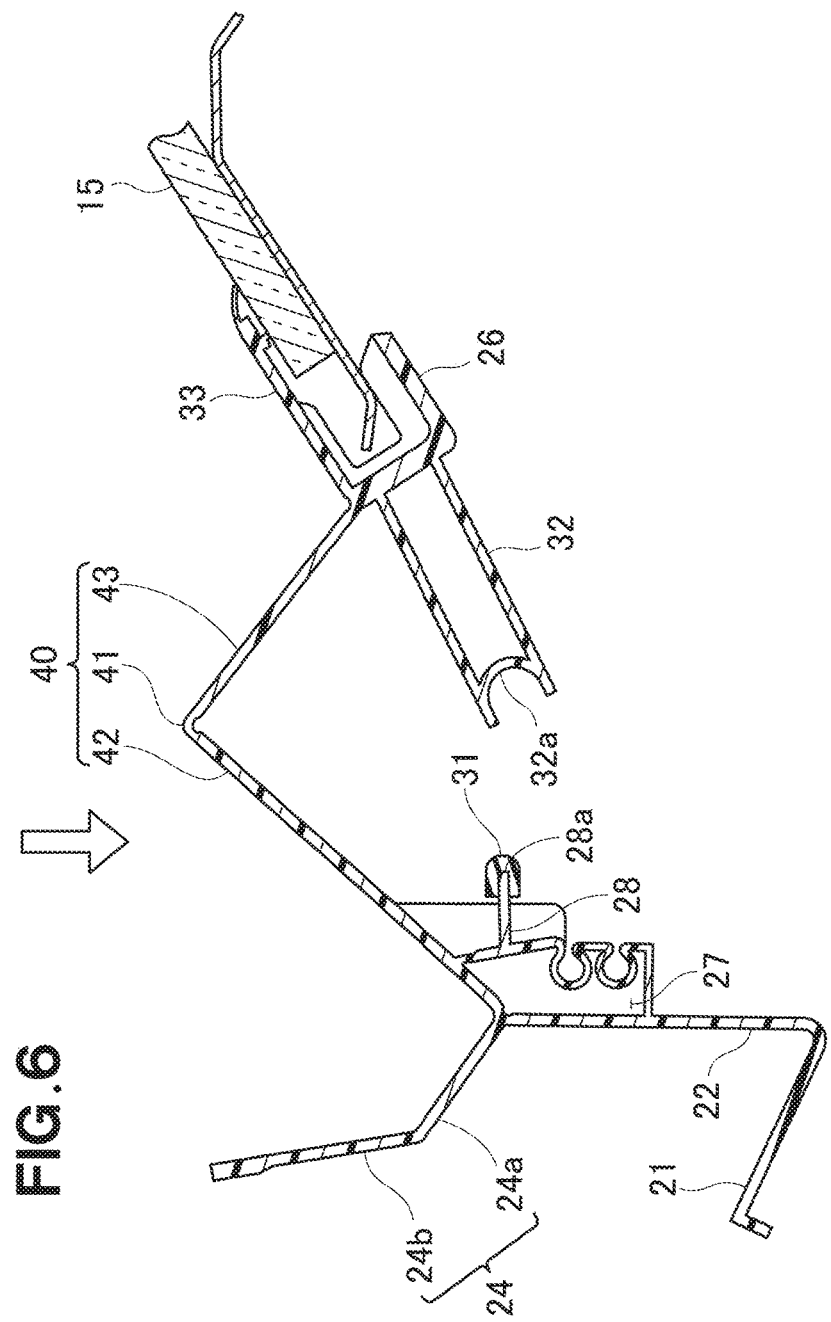
FIG. 6 is a view useful to describe a reaction when a load acts on the cowl top garnish shown in FIG. 2 from the above.

Referring to FIG. 6, the front segment 42 and the rear segment 43 spread when the load acts from above the top 41, as indicated by the white arrow.

As described above, the cowl top garnish 20 of the first embodiment of the present invention has the following advantages.

Referring to FIG. 5, the projecting portion 28 extends toward the rear segment 43 from the front segment 42. The projecting portion 28 abuts onto the load receiving portion 32 when at least a load acts in the front-rear direction. As the projecting portion 28 abuts onto the load receiving portion 32, the projecting portion 28 restricts the decreasing of the distance between the front segment 42 and the rear segment 43 even if the load further acts in the front-rear direction. For example, it is possible to restrict the twisting and/or the bending of the cowl top garnish 20 when the cowl top garnish 20 is mounted.

Referring to FIG. 6, the front segment 42 and the rear segment 43 spread when the load acts from above the top 41, as indicated by the white arrow. The projecting portion 28 and the load receiving portion 32 are not coupled with each other, in other words, the projecting portion 28 is disconnected from the load receiving portion 32. As the front segment 42 and the rear segment 43 spread, the projecting portion 28 and the load receiving portion 32 do not hinder the spreading of the front segment 42 and the rear segment 43. This can ensure an enhanced shock absorbing capability.

It is possible to provide the cowl top garnish 20 that can restrict the decreasing of the distance between the front segment 42 and the rear segment 43 and also has an enhanced shock absorbing capability.

Referring to FIG. 4, the load receiving portion 32 inclines relative to the projecting portion 28 such that the load receiving portion 32 crosses the projecting portion 28 when the vehicle body is viewed from the front. This configuration allows the projecting portion 28 to abut onto the load receiving portion 32 in a more reliable manner. Therefore, it is possible to transmit the load acting in the front-rear direction in a reliable manner.

The projecting portion 28 has a flat plate-like shape, and one of the two flat surfaces of the flat plate-like shape is directed upward. In other words, the projecting portion 28 is arranged along the horizontal plane. Thus, it is possible to efficiently form the projecting portion 28 on the cowl top garnish 20 and allow the cowl top garnish to deform even if the space for the cowl top garnish 20 is limited in the height direction.

The load receiving portion 32 has a counter face portion 32a that is a portion facing the free end 28b of the projecting portion 28. The counter face portion 32a is a planar face. The counter face portion 32a, which faces the free end 28b of the projecting portion 28, is shaped to be planar. Because the counter face portion 32a is shaped to be planar, the counter face portion 32a has a large surface, and therefore the projecting portion 28 can contact the load receiving portion 32 in a more reliable manner. Thus, it is possible to reliably transmit the load acting in the front-rear direction.

Referring to FIG. 2, the counter face portion 32a is thicker than the free end 28b of the projecting portion 28 in the up-down direction. Because the counter face portion 32a has a large surface, the projecting portion 28 can contact the load receiving portion 32 in a more reliable manner, and can reliably transmit the load acting in the front-rear direction.

The rear segment 43 includes the windshield panel engaging portions 26, with which the windshield panel 15 is engaged. The projecting portion 28 is disposed on the front segment 42, and the load receiving portion 32 is disposed on one of the windshield panel engaging portions 26. It is possible to transmit the load, which acts in the front-rear direction, to the windshield panel engaging portion(s) 26 in a more reliable manner, and can push the windshield panel engaging portion(s) 26 over the windshield panel 15.

The free end 28b of the projecting portion 28 is covered with the cushioning material 31. The projecting portion 28 may contact the load receiving portion 32 due to vibrations while the vehicle is traveling or in other occasions. Because the cushioning material 31 is interposed between the projecting portion 28 and the load receiving portion 32, it is possible to restrict generation of noises while the vehicle is traveling.

The projecting portion support 27 includes the tube clamps 27a, and each of the tube clamps 27a has a generally "C" shape when the vehicle body is looked at from the side. A load may act in the front-rear direction of the vehicle while the projecting portion 28 is abutting onto the load receiving portion 32. In this situation, the tube claims 27a deform, and absorb part of the load energy.

Second Embodiment

A second embodiment of the present invention will now be described with reference to the drawings.

Figure 7:
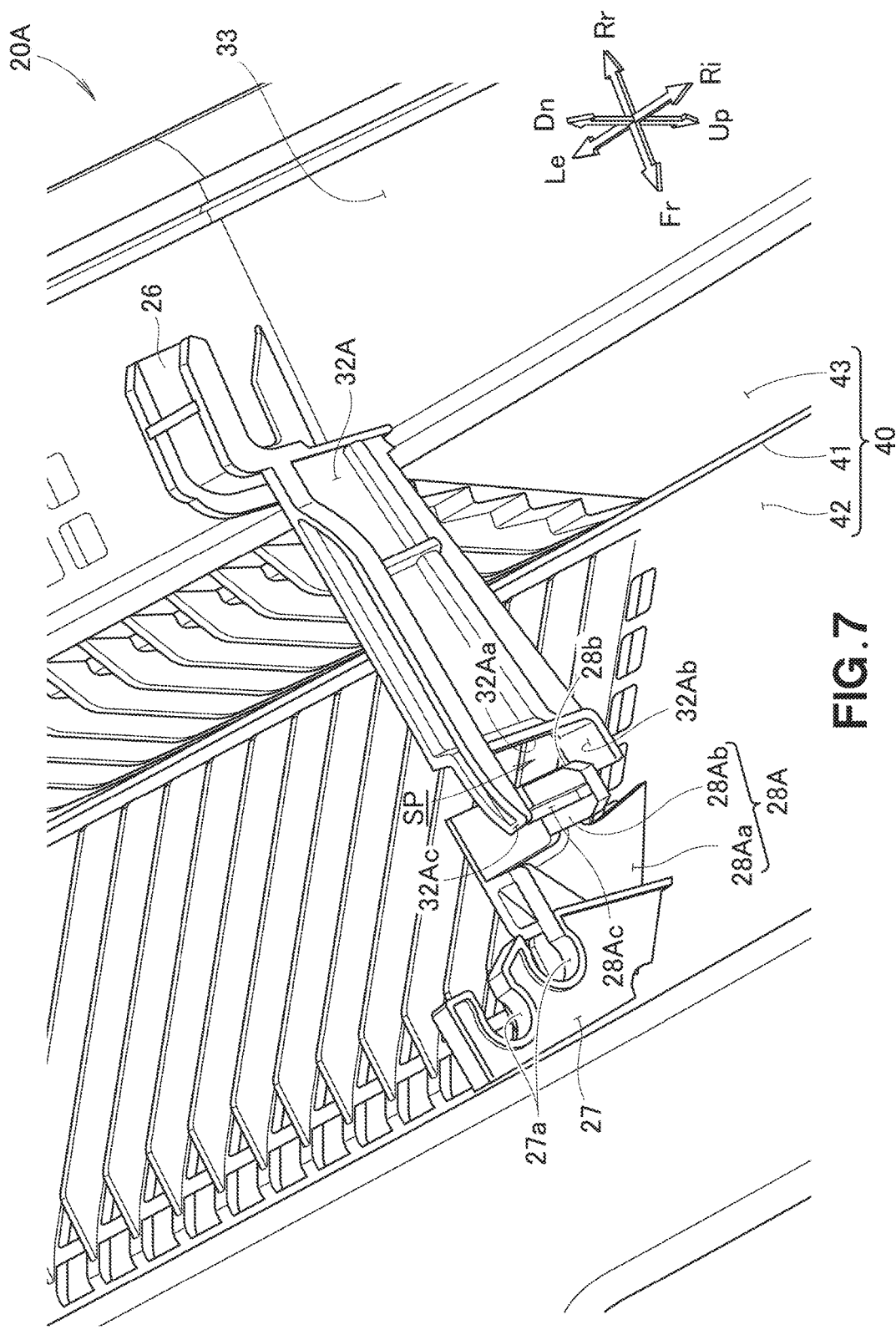
FIG. 7 is a perspective view of a cowl top garnish according to a second embodiment of the present invention.

FIG. 7 and FIG. 8 are referred to. FIG. 7 illustrates a cowl top garnish according to the second embodiment, and is similar to FIG. 4. FIG. 8 also illustrates the cowl top garnish according to the second embodiment, and is similar to FIG. 2. The fundamental structure of the cowl top garnish of the second embodiment is similar to that of the cowl top garnish of the first embodiment. The same reference numerals are used to those parts and elements which are similar to the corresponding parts and elements of the first embodiment, and detail description for such parts and elements will be omitted.

The cowl top garnish 20A of the second embodiment employs a projecting portion 28A and a load receiving portion 32A, which are different in shape from the projecting portion 28 and the load receiving portion 32 used in the cowl top garnish 20 of the first embodiment. In addition, the projecting portion 28A is spaced from the load receiving portion 32A by the distance Sp, and the projecting portion 28A abuts onto the load receiving portion 32A only when a load acts on the front segment 42 in the backward direction or when a load acts on the rear segment 43 in the forward direction. In other words, the projecting portion 28A abuts onto the load receiving portion 32A only when the distance between the front segment 42 and the rear segment 43 decreases. Details will be described below.

It should be noted that in the second embodiment, the projecting portion 28A may abut onto the load receiving portion 32A in a normal condition, which is similar to the first embodiment.

The projecting portion 28A includes a front-rear extension 28Aa extending backward from the projecting portion support 27, and a right-left extension 28Ab extending from the rear end of the front-rear extension 28Aa in the width direction of the vehicle. Ribs 28Ac are formed on upper and lower faces of the right-left extension 28Ab, respectively.

It can be said that the front-rear extension 28Aa of the projecting portion 28A is a vertical plate-like element that extends in the front-rear direction. The upper end of the front-rear extension 28Aa of the projecting portion 28A is coupled to the front segment 42.

It can be said that the right-left extension 28Ab of the projecting portion 28A is a horizontal plate-like element that extends in the width direction of the vehicle.

When the vehicle body is viewed from the front, the front-rear extension 28Aa of the projecting portion 28A is offset from the load receiving portion 32A, and extends generally in parallel to the load receiving portion 32A. When the vehicle body is viewed from the front, the right-left extension 28Ab of the projecting portion 28A overlaps the load receiving portion 32A.

The load receiving portion 32A includes an upper extension 32Ab, which is situated overlappingly above the free end 28b of the projecting portion and extends in the front-rear direction, and a lower extension 32Ac, which is situated overlappingly below the free end 28b of the projecting portion and extends in the front-rear direction.

The counter face portion 32Aa extends from the free end of the load receiving portion 32A in the width direction of the vehicle.

The upper extension 32Ab extends continuously forward from the upper end of the counter face portion 32Aa. The lower extension 32Ac extends continuously forward from the lower end of the counter face portion 32Aa. The upper extension 32Ab, the counter face portion 32Aa and the lower extension 32Ac are continuously formed, and define in combination a generally "U" shape when viewed from the side of the vehicle.

The cowl top garnish 20A according to the second embodiment of the present invention, which is described above, possesses the advantages of the present invention. The cowl top garnish 20A according to the second embodiment of the present invention also possesses the following advantages.

Referring to FIG. 8, the load receiving portion 32A includes the upper extension 32Ab, which is situated overlappingly above the free end 28b of the projecting portion and extends in the front-rear direction, and the lower extension 32Ac, which is situated overlappingly below the free end 28b of the projecting portion and extends in the front-rear direction. The free end 28b of the projecting portion is sandwiched by the upper extension 32Ab and the lower extension 32Ac in the up-down direction. This configuration allows the projecting portion 28A to contact the load receiving portion 32A in a reliable manner. It is possible restrict the twisting and the bending of the cowl top garnish 20A in a more reliable manner when the cowl top garnish 20A is mounted on the vehicle body.

Furthermore, the projecting portion 28A is located at a position away from the load receiving portion 32A by the distance Sp, and abuts onto the load receiving portion 32A only when a load is exerted in the front-rear direction. Because there is the distance Sp, it is possible to more reliably prevent the projecting portion 28 and the load receiving portion 32 from hindering the spreading of the front segment 42 and the rear segment 43 when the front segment 42 and the rear segment 43 spread. This ensures a further enhanced shock absorbing capability.

It should be noted that the area covered with the hood is the engine room in the above-described embodiment of the present invention, but the present invention may be applied to a vehicle that has the engine in a rear part of the vehicle, and a vehicle that has no engine such as an electrically powered vehicle. The cowl top garnish of the present invention can be employed as long as a crashable area in front of the passenger room is covered with a hood.

The present invention is not limited to the embodiment as long as a cowl top garnish in question can demonstrate the functions and advantages of the present invention.

INDUSTRIAL APPLICABILITY

The cowl top garnish of the present invention can preferably be applied to a passenger car.

REFERENCE NUMERALS

12: Hood
15: Windshield panel
20, 20A: Cowl top garnish
26: Windshield panel engaging portion
28, 28A: Projecting portion
28b: Free end of the projecting portion
31: Cushioning material
32, 32A: Load receiving portion
32a, 32Aa: Counter face portion
32Ab: Upper extension
32Ac: Lower extension
40: Protruding portion
41: Top
42: Front segment
43: Rear segment
Sp: Distance

What is claimed is:
1. A cowl top garnish disposed behind a hood provided at a front part of a vehicle body, the cowl top garnish extending in a width direction of a vehicle across an entire width of the vehicle, the cowl top garnish being configured to cover a front lower end of a windshield panel, the cowl top garnish comprising a protruding portion that protrudes upward, with a top thereof being situated at an upper position when the vehicle body is viewed in a lateral cross-section, the protruding portion including a front segment that is disposed in the width direction of the vehicle and extends from the top in a lower forward direction, and a rear segment that extends from the top in a lower backward direction, the protruding portion possessing flexibility that allows the front segment and the rear segment to spread when a load acts on the protruding portion from above the top, one of the front segment and the rear segment integrally having a projecting portion that projects toward the other of the front segment and the rear segment, and the other of the front segment and the rear segment integrally having a load receiving portion onto which the projecting portion abuts and receives a load acting in a generally front-rear direction.

2. The cowl top garnish according to claim 1, wherein the load receiving portion inclines relative to the projecting portion such that the load receiving portion crosses the projecting portion when the vehicle body is viewed from a front of the vehicle.

3. The cowl top garnish according to claim 1, wherein the projecting portion has a flat plate-like shape, and one of two flat surfaces of the flat plate-like shape is directed upward.

4. The cowl top garnish according to claim 1, wherein the load receiving portion has a counter face portion that faces a free end of the projecting portion and is shaped like a plane.

5. The cowl top garnish according to claim 4, wherein the counter face portion is thicker than the free end of the projecting portion in an up-down direction.

6. The cowl top garnish according to claim 4, wherein the load receiving portion includes an upper extension that is situated overlappingly above the free end of the projecting portion and extends in the front-rear direction, and a lower extension that is situated overlappingly below the free end of the projecting portion and extends in the front-rear direction.

7. The cowl top garnish according to claim 3, wherein the rear segment includes a windshield panel engaging portion, with which the windshield panel is engaged, the projecting portion is disposed on the front segment, and the load receiving portion is disposed on the windshield panel engaging portion.

8. The cowl top garnish according to claim 1, wherein the projecting portion is spaced from the load receiving portion, and abuts onto the load receiving portion only when a load acts on the front segment in a backward direction or when a load acts on the rear segment in a forward direction.

9. The cowl top garnish according to claim 5, wherein the free end of the projecting portion is covered with a cushioning material.

* * * * *